United States Patent [19]

Staton

[11] 4,159,426
[45] Jun. 26, 1979

[54] ENERGY CONVERSION SYSTEM

[76] Inventor: Ronald R. Staton, R.D. #1, Box 298, Barto, Pa. 19504

[21] Appl. No.: 775,262

[22] Filed: Mar. 7, 1977

[51] Int. Cl.² .............................................. H02P 9/04
[52] U.S. Cl. ...................................... 290/44; 322/35; 290/55
[58] Field of Search ...................... 290/43, 44, 54, 55; 415/2, 3, 4; 322/35

[56] References Cited

U.S. PATENT DOCUMENTS

| 1,783,669 | 12/1930 | Oliver | 415/2 |
| 4,087,927 | 5/1978 | Basmajian | 290/55 X |

Primary Examiner—J. V. Truhe
Assistant Examiner—John W. Redman
Attorney, Agent, or Firm—Henry H. Skillman

[57] ABSTRACT

In a venturi-shaped wind tunnel, a wind is generated by a wind generating device in the larger end of wind tunnel. Wind thus generated is caused to speed up by the venturi and drives a rotatable wind responsive device in the smaller end of the wind tunnel. The wind responsive device, in turn, drives an alternator which produces an alternating current, preferably at a fixed frequency determined by speed of rotation. The output of the alternator drives a load. The output of the alternator can also be put through a converter and converted to d.c. which drives a variable speed d.c. motor supplying power to the input fan. A monitoring means sensing the air flow may then cause a regulator to adjust the speed of the d.c. motor to maintain alternator speed constant.

7 Claims, 1 Drawing Figure

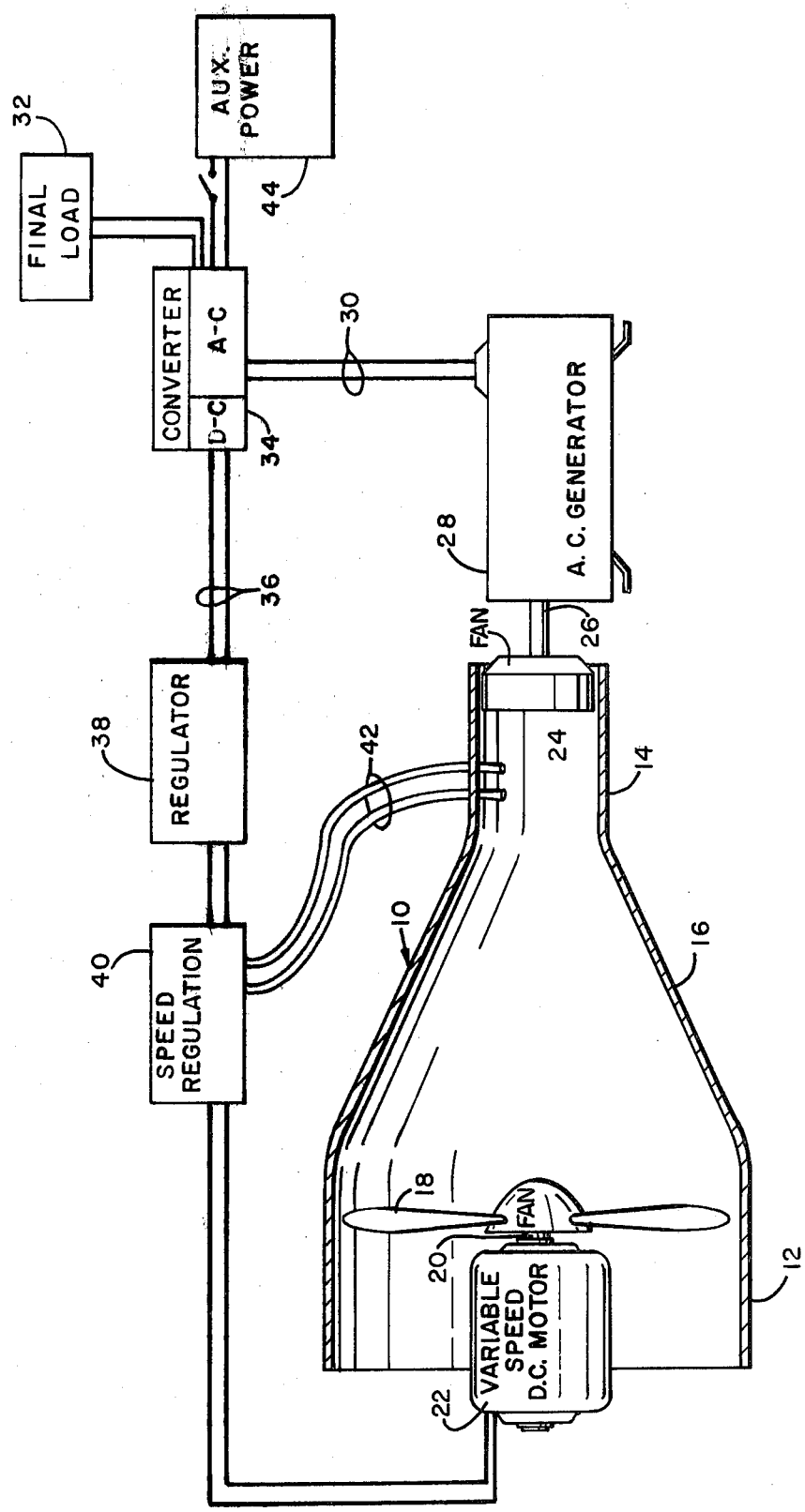

ENERGY CONVERSION SYSTEM

The present invention concerns a system in which electrical energy is converted into wind energy, in turn, to drive a wind mill which turns a generator, preferably an alternator. Wind speed is preferably increased through the use of a venturi-shaped wind tunnel in which the wind generating and wind responsive members are located. Output of the driven generator may be fed back through conversion controls in a form appropriate to the motor driving the wind generating means.

Such a system is preferably open ended through the wind tunnel and may be positively assisted by natural winds or other means producing air flow. If the purpose is to obtain generator output of fixed frequency which may be used to operate a load of any conventional type, feedback is used to maintain and control the wind generator so that its output will maintain the driven alternator at constant frequency. Sensing means used to monitor the actual total wind effect at the wind responsive device may modify the motor speed of the wind generator through an appropriate regulator to adjust wind generator speed so as to maintain constant frequency of the alternator output. To this end the wind generator is preferably driven by a variable speed drive means, such as a d.c. motor. The system also, or alternatively, contemplates having input from other auxilliary power sources to supplement the generator power as needed to drive the variable speed motor and other applied leads.

More specifically, the present invention concerns an energy conversion system comprising a wind tunnel preferably having a cross-section reducing transition portion joining together large and small cross-sectional area portion. A rotatable air flow creating device is attached to and driven by a variable speed motor. The rotatable air flow creating device is located in the wind tunnel in the large cross-section portion and arranged to create an air flow from the large to the small cross-sectional area portion whereby the velocity of the air flow is increased in passing through the cross-section reducing portion. A rotatable air flow responsive device is located in the small cross-sectional area of the wind tunnel and supported to be driven rotationally in response to that air flow. A generator is coupled and responsive to the rotatable air flow responsive device to generate an electrical output. Means is provided to couple the said output of the generator to a load.

A control for varying motor speed enables output frequency to be maintained constant when the generator is an a.c. generator or alternator. Preferably, the system employs a feedback loop from the generator output to the variable speed motor including means to convert the output of the generator to a form useable by the variable speed motor and to vary the motor speed. In preferred forms, where the generator is an a.c. generator and the variable speed motor is a d.c. motor, the conversion means is, of course, an a.c./d.c. converter. Suitable means is preferably provided to regulate the variable speed d.c. motor to cause the rotatable air current creating device to produce an air flow which, in turn, will cause the rotatable air flow responsive device to drive the generator at fixed speed to cause a fixed frequency output. The wind tunnel is preferably open-ended and may accommodate natural winds as well as generated wind from the recited wind generating means and others. A power supply is available to supplement the effect of the generator as needed.

For a better understanding of the present invention reference is made to the accompanying drawing which is a schematic diagram showing a preferred system.

Referring to the drawing, the wind tunnel, generally designated 10, is diagramatically represented as a variable diameter tube which is preferably of circular cross-section, although it may have another form. The wind tunnel is made up of a large diameter portion 12, a small diameter portion 14 and an intermediate transition portion 16, preferably in the form of a venturi, but in any event effective to change the cross-sectional area in transition between the large and small diameter portions. Within the large diameter portion is located a fan 18, or other rotatable air flow creating device, preferably located coaxially within that portion. Fan 18 is rotatable about a shaft 20 of a variable speed direct current motor 22 on which it is fixed and by which it is driven to produce air flow down the wind tunnel. Air flow or wind, produced by fan 18 will increase in speed as it passes through the venturi portion 16 so that when it reashes the small diameter portion, the air current is of very much increased velocity to drive the air flow responsive device 24. Air flow responsive device 24 is a fan or blower, preferably located coaxially in the small cross-sectional area portion of the wind tunnel to occupy as much of the cross-section as possible and supported to be driven rotationally in response to the air flow generated by the fan 18. The fan or blower 24 is rotatably supported on the shaft 26 of a.c. generator 28 and causes roatation of the generator to produce an output of alternating current through lines 30 for application to a load 32. The alternating current is fed through a converter 34 which converts alternating current to direct current which is fed to the variable speed d.c. motor through lines 36 through a regulator 38 helping to stabilize the voltage and a speed regulator 40 adjusting the d.c. current to drive the motor 22 at such speed that the air flow produced by the fan 18 will produce a steady frequency a.c. output from generator 28. In order to ensure proper speed regulation, a suitable sensing means 42 senses the air pressure effects acting on fan 24 and produces a signal. This signal, in turn, acts upon speed regulator 40 to make necessary adjustments to keep the d.c. motor at the speed required to produce air flow to maintain the steady frequency of rotation of generator 28. In the event that insufficient power is generated to this manner, auxilliary power is available from source 44 as supplemented by closing its switch to include it in the circuit. In this manner, it can be seen that requirements of a load not generated by the a.c. generator can be supplemented by city power. It is also possible that supplemental air flow by additional air flow sources supplied to the wind tunnel or natural winds to entering the wind tunnel will supplement power supplied to the propellor 18.

In some modifications of the systems a venturi-shaped wind tunnel is not required. Other modifications to the invention as described herein will occur to those skilled in the art. All such modifications are intended to be within the scope and spirit of the present invention.

I claim:
1. An energy conversion system comprising:
    a wind tunnel having cross-section reducing transition portion joining together large and small cross-sectional areas portions;
    a variable speed motor;
    a power source for the motor;

a rotatable air flow creating device attached to and driven by said variable speed motor located in said wind tunnel in a large cross-section portion and arranged to create an air flow from the large to the small cross-sectional area portion whereby the velocity of the air flow is increased in passing through the cross-section reducing portion;

a rotatable air flow responsive device located in a small cross-sectional area portion of said wind tunnel and supported to be driven rotationally in response to said air flow through said wind tunnel;

an alternating current generator coupled and responsive to said rotatable air current responsive device to generate an electrical output;

speed regulator means to vary the speed of the variable speed motor to enable the output frequency of the a.c. generator to be maintained constant; and means to couple said output to a load.

2. The system of claim 1 in which a feedback loop is provided through appropriate means from the a.c. generator to the variable speed motor so that the generator provides at least part of the power source for the motor.

3. The system of claim 1 in which the variable speed motor is a d.c. motor.

4. The system of claim 3 in which a feedback loop is provided from the a.c. generator to the variable speed motor through an a.c. to d.c. converter.

5. The system of claim 4 in which suitable air flow sensing means are provided to monitor air flow in the vicinity of the air flow responsive device and produce a signal which causes modification of feedback flow so as to adjust the speed of the d.c. motor to maintain the frequency of the a.c. generator constant.

6. The system of claim 5 in which auxilliary power is provided with suitable switching means in case additional power is required to drive the variable speed motor and other load.

7. An energy conversion system comprising
a wind tunnel,
a variable speed d.c. motor,
a rotatable air flow creating device attached to and driven by said variable speed d.c. motor located in said wind tunnel and arranged to create an air flow in said wind tunnel,
a rotatable air flow responsive device located in said wind tunnel and supported to be driven rotationally in response to said air flow through said wind tunnel,
an a.c. generator coupled and responsive to said rotatable air current responsive device to generate an alternating current output,
means to couple said alternating current output to a load,
feedback means including a suitable a.c. to d.c. converter connecting the a.c. generator to the d.c. motor,
sensing means sensing the effect of air flow at the air flow responsive device and producing a signal representative thereof, and
speed regulator means in said feedback means responsive to signals generated by the sensing means to vary the speed of the d.c. motor in order to maintain a predetermined frequency at the a.c. generator.

* * * * *